Figure 1:
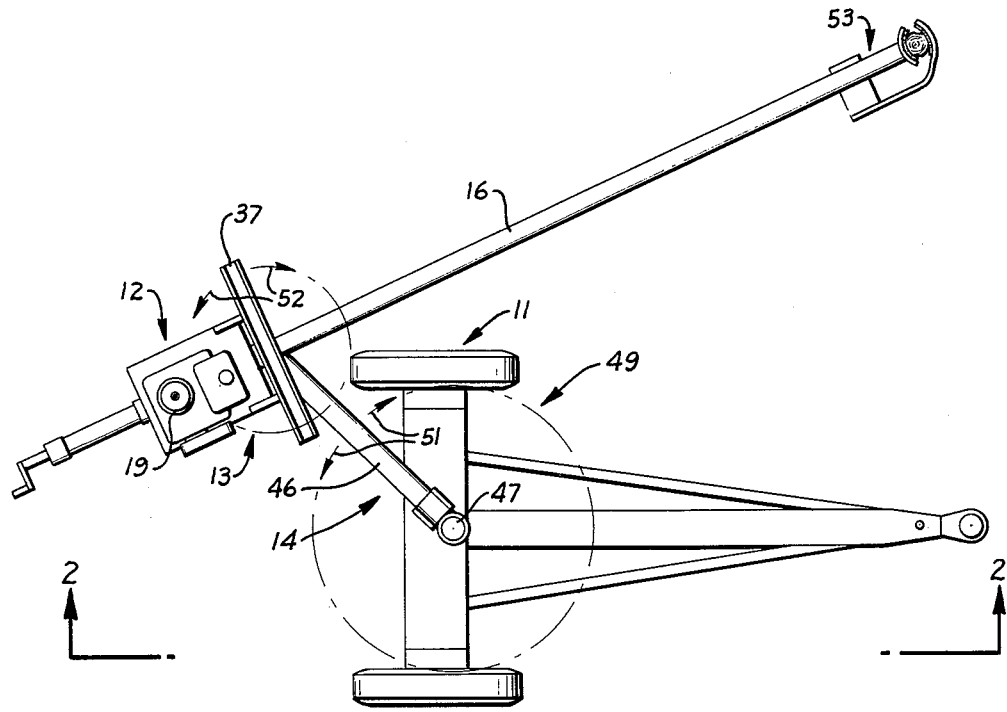

Oct. 23, 1962  R. M. SHIPLEY, JR  3,059,402
TREE SHAKER APPARATUS
Filed March 8, 1962  3 Sheets-Sheet 1

INVENTOR.
ROBERT M. SHIPLEY, JR.
BY
Schapp & Hatch
ATTORNEYS

Oct. 23, 1962 R. M. SHIPLEY, JR 3,059,402
TREE SHAKER APPARATUS
Filed March 8, 1962 3 Sheets-Sheet 2

INVENTOR.
ROBERT M. SHIPLEY, JR.
BY *Schapp & Hatch*
ATTORNEYS

Oct. 23, 1962  R. M. SHIPLEY, JR  3,059,402
TREE SHAKER APPARATUS
Filed March 8, 1962  3 Sheets-Sheet 3

INVENTOR.
ROBERT M. SHIPLEY, JR.
BY Schapp & Hatch
ATTORNEYS 3,059,402
Patented Oct. 23, 1962

3,059,402
TREE SHAKER APPARATUS
Robert M. Shipley, Jr., Preston Heights, Cloverdale, Calif.
Filed Mar. 8, 1962, Ser. No. 178,394
18 Claims. (Cl. 56—328)

The present invention relates to improvements in a tree shaker apparatus and particularly to a tree shaker apparatus suitable for the purpose of gathering fruits or nuts which have ripened on the trees.

It is known to gather ripened fruits or nuts by shaking the tree and gathering the harvest from the ground or a collecting means using one of a number of known methods. In one type of shaker, the trees are shaken by means of a cable or similar device which periodically pulls and releases the trunk or branch to dislodge the fruit from the tree. Another type of shaker utilizes a rigid member or boom which is oscillated so as to force the limbs of the tree back and forth with a reciprocating motion. It is the latter type of tree shaker to which the present invention is directed.

The type of motion which is most satisfactory for dislodging fruits or nuts varies for different trees and is not necessarily the most energetic motion. Accordingly, an optimum period of vibration and an optimum vibrational magnitude are highly desirable for the most efficient removal of each variety of fruit, and these optima can change from tree to tree. Control of these factors is also valuable in assuring minimum injury to the tree. In this connection, shakers which employ a rigid member or boom are generally preferred to those which utilize a rope or a cable because of the improved control of the shaking action.

However, certain of the known machines which utilize rigid members tend to cause injury to the tree. This injury or damage is usually the result of anchoring the boom to a fixed or incordinately heavy support object, which causes excessive jolting of the tree through the application of extreme forces.

Accordingly, it is the primary object of this invention to provide a tree shaking apparatus which utilizes a boom for vibrating the tree and in which the boom is supported in a floating mounting unit whereby the inertia of the floating unit opposes the reactive and resilient forces exerted by the tree in a manner cushioning and controlling the shaking action.

Another object of the invention is to provide a tree shaking apparatus of the character described which is balanced at its support so as to put a minimum load of vertical forces on the tree or branch being shaken.

A further object of the invention is to provide a tree shaking apparatus which is adjustable to provide optimum shaking characteristics for various types and sizes of trees.

A still further object of this invention is to provide a tree shaking apparatus in which the boom is supported in a central location thereof, and in which the operator has improved control over the handling of the boom and the vibrational forces imparted thereto.

Still another object of this invention is to provide a tree shaking apparatus of the character described in which the above mentioned advantages are obtained with a minimum of structure which may be easily moved from operative position in one tree to operative position in another.

Further objects and advantages of my invention will be apparent as the specification progresses, and the new and useful features of my tree shaker will be fully defined in the claims attached hereto.

Figure 2:
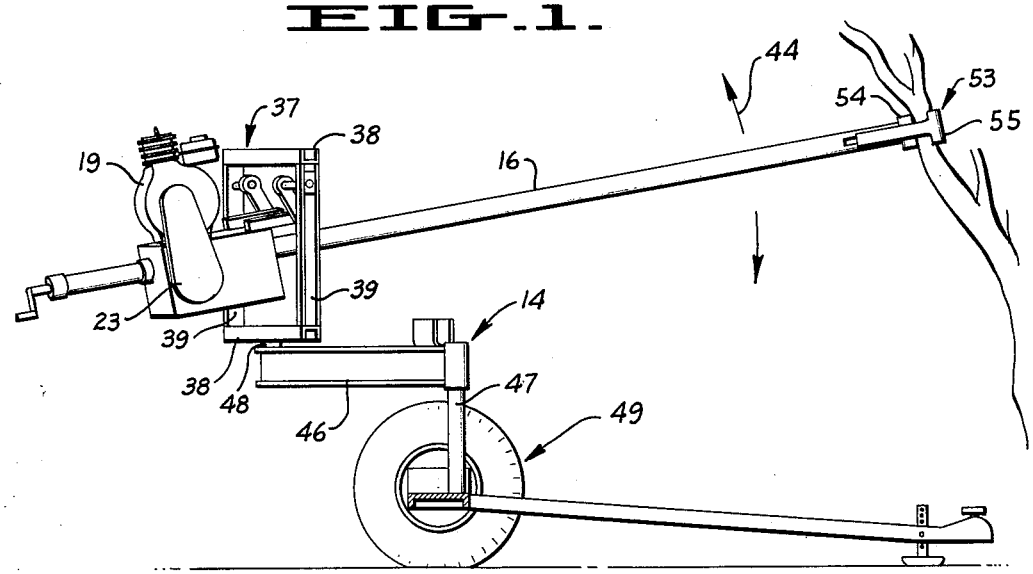
Figure 3:
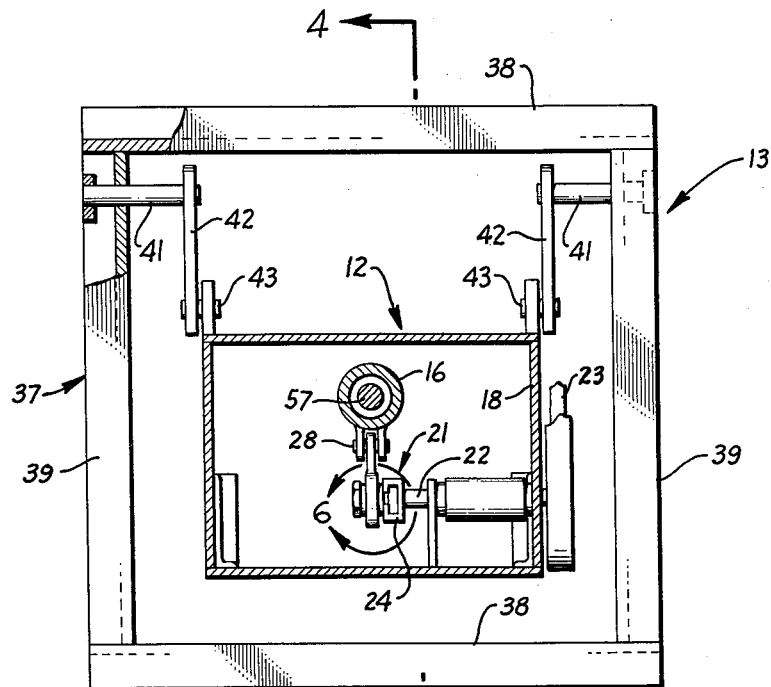
Figure 4:
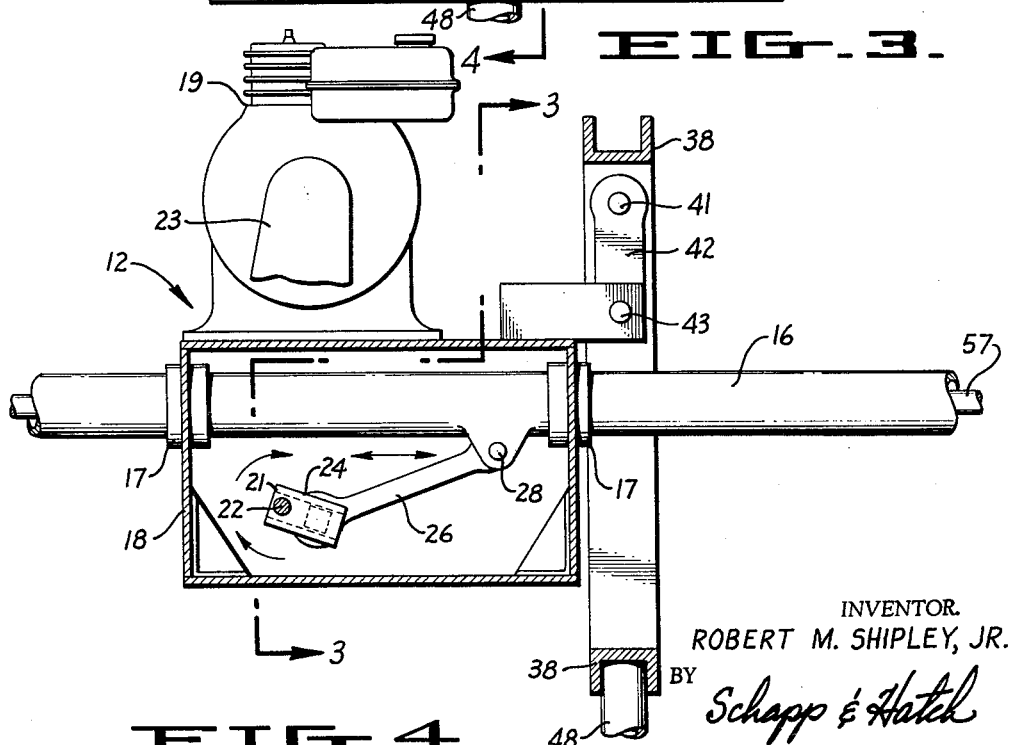
Figure 5:
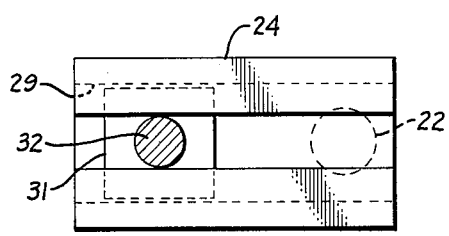
Figure 6:
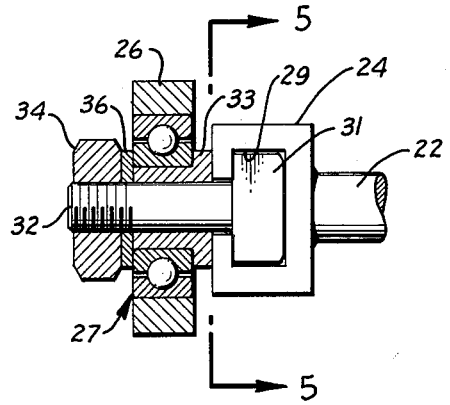
Figure 7:
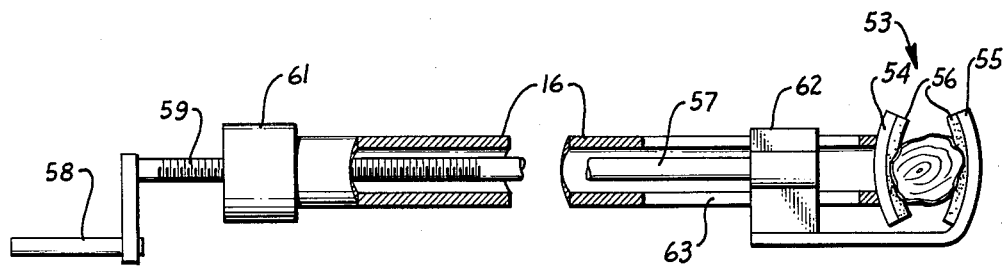
Figure 8:
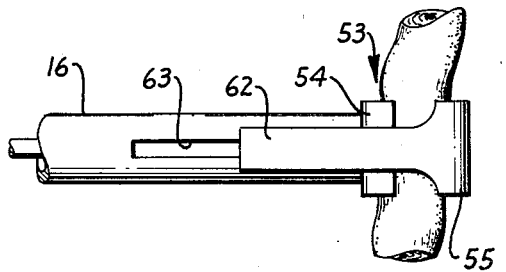

The preferred form of my invention is illustrated in the accompanying drawing forming part of this application, in which:

FIGURE 1 is a plan view illustrating a typical tree shaking apparatus constructed according to the invention;

FIGURE 2, an elevational view of the tree shaking apparatus shown in FIGURE 1 in operating position;

FIGURE 3, a sectional view taken along the line 3—3 FIGURE 4 illustrating in greater detail certain of the parts of the tree shaking apparatus;

FIGURE 4, an enlarged fragmentary view of the tree shaking apparatus of FIGURE 1 partly in section as seen in the plane of line 4—4 of FIGURE 3;

FIGURE 5, an enlarged view partly in section of the mechanism utilized to provide shaking motion as taken in the plane of the line 5—5 of FIGURE 6;

FIGURE 6, an enlarged view partly in section further illustrating the mechanism defined within line 6 in FIGURE 3;

FIGURE 7, an enlarged fragmentary view, partly in section, illustrating in better detail the boom and means carried on the boom adapted to grip the tree to be shaken; and FIGURE 8, an enlarged elevational view illustrating in better detail the means for gripping the tree shown in FIGURE 7.

While I have shown only the preferred form of my invention, it should be understood that various changes or modifications may be made within the scope of the claims attached hereto without departing from the spirit of the invention.

Referring to the drawing in greater detail there is shown a tree shaking apparatus 11 comprising an oscillating unit 12, mounting means 13 for holding said oscillating unit, and holding means 14 for supporting said mounting means.

The oscillating unit 12 contains a boom 16 journaled at 17 for free axial movement and a frame or housing 18 of the oscillating unit. Means are also carried on the oscillating unit 12 for reciprocating the boom 16 with respect thereto, said means including a motor 19 which is preferably an internal combustion motor, and a crank 21 having an axle portion 22 journaled for rotation in frame 18 and driven by motor 19 through a drive means 23. The crank 21 also contains a crank arm 24 which has a connecting rod 26 rotatively mounted thereon by means of a ball bearing unit 27. The other end of connecting rod 26 is pivotally mounted on the boom 16 at 28 so that rotary motion from the motor is transferred through the crank 21 to effect reciprocating motion of the boom 16.

As indicated above, it is desirable for the operator to be able to adjust the magnitude of the reciprocating motion on the boom and this is achieved according to the present invention by adjusting the length of the crank arm 24 which is effective in translating the rotary motion from the motor through the connecting rod 26. As here shown, the adjustment is achieved by utilizing a crank arm having a T-slot 29 which is adapted to slidably hold a T-head 31 of a bolt 32. The shank of bolt 32 serves as an axle around which connecting rod 26 is rotatable, and the rotatable mounting as here shown includes a collar 33 and ball bearing unit 27. Locking means are provided for locking the bolt 32 to crank arm 24 by clamping engagement of the T-head of the bolt in the T-slot of the crank arm. This clamping engagement is effected by tightening nut 34 against washer 36 which in turn bears against the internal race of ball bearing unit 27, collar 33 and crank arm 24. Adjustment is achieved simply by loosening nut 34, which may be knurled for easy gripping, moving the bolt 32 to the desired position along crank arm 24 and re-tightening nut 34 to lock the bolt in position on the crank arm.

An important feature of the invention is the provision of a structure or means which supports the oscillating unit 12 in a floating position, and in which the motor and drive structure is carried on said unit. With such a structure, the tree is shaken by the opposed inertia forces of the oscillating unit. Accordingly, it is desirable to have sufficient weight on the oscillating unit to provide a high enough moment of inertia for the unit to provide sufficient shaking, and the motor contributes a reasonable amount of weight to the unit. For this reason an internal combustion motor is preferred, although it is to be understood that other sources of rotary motion or other motors such as electric motors would be operative. However, the internal combustion engine provides an independent portable unit which does not need an outside power source, while an electric motor would require batteries or a power take-off from a tractor or like vehicle.

As here shown, the mounting means 13 for holding the oscillating unit 12 comprises a support frame 37 which is in the shape of an open rectangle having a pair of horizontal members 38 and a pair of vertical members 39. Support frame 37 is also mounted for rotation around shaft 48, see FIGURE 3. Pivotally connected through pins 41 and carried on vertical members 39, are a pair of arms 42 which support oscillating unit 12 through pins 43. Pins 41 lie in a common axis and pins 43 lie in a different common axis with distance between pins 41 and 43 being the same on each arm 42 so as to allow the oscillating unit to swing back and forth in opposition to the reciprocating motion of boom 16.

It is also within the ambit of this invention to utilize other types of floating mountings so that the oscillating unit 12 is free for reciprocating motion. For example, arms 42 could be replaced with cables or chains and serve a similar function. Alternatively, the oscillating unit 12 could be mounted for axial reciprocating movement on one or more shafts which in turn could be connected to support frame 37. However, if the oscillating unit were mounted on shafts, it would be desirable to include springs or other shock absorbing means at the limit points to protect against unwanted jolting or jarring. Accordingly, the structure illustrated in the drawing is preferred because of the plurality of the functions performed in a simple structure.

Another function achieved by use of the support arms 42 is the ability of the operator to pivot the oscillating unit and accompanying boom through a vertical plane as indicated by arrows 44 in FIGURE 2 so as to provide the desired vertical positioning of the tree gripping means at the end of the boom.

In general, any method for holding support frame 37 would be operative, but I prefer to utilize the holding means 14 illustrated in the drawings.

Holding means 14 includes a substantially horizontal arm 46 rotatably mounted on a vertical support 47 and a vertical axle or like member 48 journaled for rotation on horizontal arm 46 and attached to the lower horizontal member 38 of support frame 37 for free rotation of the support frame around a vertical axis. In the preferred form, vertical support 47 is mounted on a trailer unit 49 so as to render the device more portable and provide easy transfer from one tree to another.

As best seen in FIGURES 1 and 2, the mounting here shown allows for rigid and accurate positioning of the boom by the operator. For example, the entire unit may be positioned around the circumference of the circle defined by horizontal arm 46 while it is rotated around the vertical support 47 as indicated by arrows 51 in FIGURE 1. The horizontal direction of the boom 16 is that obtained by rotation of support frame 37 and vertical axle 48 in the mounting thereof so as to provide movement in either direction as indicated by arrows 52 of FIGURE 1.

The vertical positioning of the boom is obtained through the adjustment of the inclination of boom 16 by the appropriate pivoting of arms 42. This adjustment also facilitates fastening of the end of the boom on the tree through tree gripping means 53.

As best seen in FIGURES 7 and 8, the tree gripping means includes an abutting plate 54 which is adapted to fit against the tree or the limb to be shaken and a cooperating plate 55 which is drawn against the tree or limb on the side opposite plate 54. In order to protect the tree from injury, the plates 54 and 55 have cushions 56 on the surfaces adapted to grip the tree.

The relative distance between plate 54 and plate 55 is controlled by rotation of shaft 57 by means of hand crank 58 through threads 59 which engage the internally threaded fitting 61 attached to boom 16, see FIGURE 7. Thus, shaft 57 moves axially as it is rotated and this axial motion is transferred through a collar (not shown) or like means to slide piece 62. As best seen in FIGURE 8, slide piece 62 fits through slot 63 in boom 16 for relative axial motion thereto and carries plate 55 at its outer end. Fitting 61 may be a split nut or other similar structure capable of sliding over the threads 59 for easy initial adjustment, and then capable of gripping the threads for clamping engagement.

Although the structure here shown for attaching the boom to the tree is preferred because it provides good control to the operator and is rather simple in construction, other means for attaching the boom could be used. For example, the shaft 57 could be moved axially into and out of gripping engagement with the tree by means of a powered unit, if desired. Such unit could be a pneumatic or hydraulic cylinder operating on pressure or vacuum from a conventional source or it could be a small electric motor. In other words, in the broad aspect of this invention, any means carried on the boom adapted to grip the tree to be shaken may be used.

From the foregoing description, it is seen that my tree shaking unit can be moved readily into position for shaking a tree or limb and that the operator can handle the boom at the lower end thereof to position it on the tree to be shaken. Similarly, the operator can adjust the crank arm if necessary to provide the optimum degree of shaking without changing his position.

It is also seen that the structure provided carries the oscillating unit and boom journaled therein in a substantially balanced position so as to prevent undue vertical force on the tree while simultaneously providing a floating mount whereby sudden jolts of the tree are positively avoided.

In operation, the tree shaking apparatus is moved about on trailer unit 49 by means of a tractor or even by hand if desired. When the trailer unit is positioned near a tree, horizontal arm 46 is pivoted horizontally around vertical support 47 to position support frame 37 in a desired location. Then support frame 37 is rotated around shaft 48 so that the boom points in the desired direction toward the tree. The boom is then pivoted on a horizontal axis so as to position abutting plate 55 behind the tree or bough to be gripped for shaking. Obviously, the sequence of these rotations and pivotal movements may be varied, and minor adjustment of any one of them may be made freely so as to bring plate 55 in exactly the desired position. With plate 55 thus positioned, plate 54 is clamped against the other side of the tree or bough through axial movement of shaft 57. As here shown, this axial movement is provided by the operator, and tight clamping is also effected by him through handle 58.

With the tree thus clamped, the operator may make a preliminary adjustment of crank arm 24 based on prior experience so as to achieve optimum shaking for the particular tree. With the adjustment thus made, the operator turns on the motor and provides the desired shaking movement to the tree. In the event that the operator believes adjustment of crank arm 24 should be made, he can shut off the motor, loosen nut 34, slide bolt 32 in the desired position, and tighten nut 34. With the crank readjusted, the operator starts the motor again and completes the shaking operation.

After the tree has been shaken, the tree gripping means 53 is removed from the tree and the unit moved on to the next tree. An experienced operator can make the necessary adjustments rapidly on the present apparatus and shake the trees in such a way that the fruits or nuts are rapidly removed therefrom without undue injury to the tree.

I claim:

1. A tree shaking apparatus comprising an oscillating unit containing a boom journaled for axial movement through said oscillating unit, means carried on the boom adapted to grip a tree to be shaken, means carried on said oscillating unit for reciprocating the boom with respect thereto, and mounting means holding said oscillating unit in a manner which allows free reciprocation of the oscillating unit whereby the reciprocation of the boom and the tree gripped thereby is balanced by opposed reciprocation of the oscillating unit.

2. A tree shaking apparatus comprising an oscillating unit containing a boom journaled for axial movement through said oscillating unit, means carried on the boom adapted to grip a tree to be shaken, a motor carried on said oscillating unit for providing rotary motion, a crank rotated by said motor, a connecting rod pivotally connected to the boom and rotatably connected to the crank on its arm for transferring rotary motion of the motor to reciprocating motion of the boom, and mounting means holding said oscillating unit in a manner which allows free reciprocation of the oscillating unit whereby the reciprocation of the boom and the tree gripped thereby is balanced by opposed reciprocation of the oscillating unit.

3. The tree shaking apparatus defined in claim 2 in which the length of the crank arm is adjustable.

4. The tree shaking apparatus defined in claim 3, in which the crank arm contains an axially extending slot, and the connecting rod contains locking means for securing the rod at any desired position along the slot of the crank arm.

5. A tree shaking apparatus comprising an oscillating unit containing a boom, means carried on the boom adapted to grip a tree to be shaken having an axially movable rigid clamping member extending over a major portion of the boom, means carried on said oscillating unit for reciprocating the boom with respect thereto, and support means for said oscillating unit which support the weight of the oscillating unit at a central location thereof while allowing the unit to be pivoted in a vertical plane and free for reciprocating motion.

6. A tree shaking apparatus comprising an oscillating unit containing a boom, means carried on the boom adapted to grip a tree to be shaken, means carried on said oscillating unit for reciprocating the boom with respect thereto, a support frame, and mounting means carried by said support frame for holding said oscillating unit against the force of gravity, said mounting means carrying the oscillating unit for free reciprocating motion whereby reciprocation of the boom and the tree gripped thereby is balanced by opposed reciprocation of the oscillating unit, and said mounting means is also pivotally connected to said oscillating unit near the center of gravity thereof in such a manner that the oscillating unit is free to pivot in a vertical plane.

7. A tree shaking apparatus comprising an oscillating unit containing a boom, means carried on the boom adapted to grip a tree to be shaken, means carried on said oscillating unit for reciprocating the boom with respect thereto, a support frame, and a pair of arms each pivotally mounted to said support frame at one place on the arm and pivotally mounted to a central portion of said oscillating unit at another place on the arm.

8. A tree shaking apparatus comprising an oscillating unit containing a boom journaled for axial movement through said oscillating unit, means carried on the boom adapted to grip a tree to be shaken, means carried on said oscillating unit for reciprocating the boom with respect thereto, a support frame, and mounting means carried by said support frame for holding said oscillating unit against the force of gravity at a central location on said oscillating unit.

9. A tree shaking apparatus comprising an oscillating unit containing a boom journaled for axial movement through said oscillating unit, means carried on the boom adapted to grip a tree to be shaken, a motor carried on said oscillating unit for providing rotary motion, a crank rotated by said motor, a connecting rod pivotally connected on the boom and rotatably connected to the crank on its arm for transferring rotary motion of the motor to reciprocating motion of the boom, a support frame, and mounting means carried by said support frame for holding said oscillating unit against the force of gravity, said mounting means carrying the oscillating unit for free reciprocating motion whereby reciprocation of the boom and the tree gripped thereby is balanced by opposed reciprocation of the oscillating unit, and said mounting means is also pivotally connected to said oscillating unit near the center of gravity thereof in such a manner that the oscillating unit is free to pivot in a vertical plane.

10. The tree shaking apparatus defined in claim 9, in which the crank arm contains an axially extending slot and the connecting rod contains locking means for securing the rod at any desired position along the slot in the crank arm.

11. A tree shaking apparatus comprising an oscillating unit containing a boom, means carried on the boom adapted to grip a tree to be shaken, means carried on said oscillating unit for reciprocating the boom with respect thereto, a support frame, mounting means carried by said support frame for holding said oscillating unit against the force of gravity, holding means for said support frame including a substantially horizontal arm rotatably mounted on a vertical support member, and a vertical member attached to said horizontal arm and said support frame for free rotation of said support frame around the vertical axis of the vertical member.

12. A tree shaking apparatus comprising an oscillating unit containing a boom journaled for axial movement through said oscillating unit, means carried on the boom adapted to grip a tree to be shaken, means carried on said oscillating unit for reciprocating the boom with respect thereto, a support frame, mounting means carried by said support frame for holding said oscillating unit against the force of gravity, holding means for said support frame including a substantially horizontal arm rotatably mounted on a vertical support member, and a vertical member attached to said horizontal arm and said support frame for free rotation of said support frame around the vertical axis of the vertical member.

13. A tree shaking apparatus comprising an oscillating unit containing a boom journaled for axial movement through said oscillating unit, means carried on the boom adapted to grip a tree to be shaken, a motor carried on said oscillating unit for providing rotary motion, a crank rotated by said motor, a connecting rod pivotally connected on the boom and rotatably connected to the crank on its arm for transferring rotary motion of the motor to reciprocating motion of the boom, a support frame, mounting means carried by said support frame for holding said oscillating unit against the force of gravity, holding means for said support frame including a substantially horizontal arm rotatably mounted on a vertical support member, and a vertical member attached to said horizontal arm and said support frame for free rotation of said support frame around the vertical axis of the vertical member.

14. A tree shaking apparatus comprising an oscillating unit, and mounting means carried on a trailer for supporting said oscillating unit for free horizontal movement; said oscillating unit containing a boom, means carried on the boom adapted to grip a tree to be shaken, and means carried on said oscillating unit for reciprocating the boom with respect thereto; said mounting means containing a vertical support mounted on the trailer, a substantially horizontal support arm mounted on said vertical support for rotation in a substantially horizontal plane, and a substantially vertical support means on said horizontal support arm for holding the oscillating unit against the force of gravity, said vertical support means carrying said oscillating unit through means allowing horizontal rotation around said support means as an axis.

15. A tree shaking apparatus comprising an oscillating unit, and mounting means carried on a trailer for supporting said oscillating unit for free horizontal movement; said oscillating unit containing a boom, clamping means mounted on the boom for gripping a tree to be shaken including a fixed clamping plate and a movable clamping plate, said movable clamping plate being held on a shaft extending over a major portion of the boom which is adapted to receive clamping force at the end of the shaft opposite the clamping plate, and means carried on said oscillating unit for reciprocating the boom with respect thereto; said mounting means containing a vertical support mounted on the trailer, a substantially horizontal support arm mounted on said vertical support for rotation in a substantially horizontal plane, and a substantially vertical support means on said horizontal support arm for holding the oscillating unit against the force of gravity, said vertical support means carrying said oscillating unit through means allowing horizontal rotation around said support means as an axis.

16. A tree shaking apparatus comprising an oscillating unit, and mounting means carried on a trailer for supporting said oscillating unit for free horizontal movement; said oscillating unit containing a boom, clamping means mounted on the boom for gripping a tree to be shaken including a fixed clamping plate and a movable clamping plate, said movable clamping plate being held on a shaft extending over a major portion of the boom which is adapted to receive clamping force at the end of the shaft opposite the clamping plate, means at the rear of the boom for controlling the clamping force applied to the clamping means, and means carried on said oscillating unit for reciprocating the boom with respect thereto; said mounting means containing a vertical support mounted on the trailer, a substantially horizontal support arm mounted on said vertical support for rotation in a substantially horizontal plane, and a substantially vertical support means on said horizontal support arm for holding the oscillating unit against the force of gravity, said vertical support means carrying said oscillating unit through means allowing horizontal rotation around said support means as an axis.

17. The tree shaker apparatus defined in claim 13, in which the connecting rod contains locking means for securing the rod at any desired position along the crank arm.

18. The tree shaker apparatus defined in claim 13, in which the vertical member of the holding means is carried on a trailer.

References Cited in the file of this patent

UNITED STATES PATENTS

| | | |
|---|---|---|
| 2,159,311 | Berger | May 23, 1939 |
| 2,690,639 | Goodwin | Oct. 5, 1954 |
| 2,700,268 | Lowe | Jan. 25, 1955 |
| 3,013,374 | Balsbaugh | Dec. 19, 1961 |